United States Patent [19]
Mehta

[11] 3,800,197
[45] Mar. 26, 1974

[54] STATIC SWITCHING SYSTEM FOR INSTANTANEOUSLY MAKING VARIOUS CONNECTIONS BETWEEN TWO D.C. MACHINES

[75] Inventor: Robert Mehta, Paris, France

[73] Assignee: Jeumot-Schneider, Paris, France

[22] Filed: Feb. 20, 1973

[21] Appl. No.: 334,144

[30] Foreign Application Priority Data
Feb. 18, 1972 France .................. 72.05470

[52] U.S. Cl. ............ 318/93, 318/87, 318/95, 318/111
[51] Int. Cl. ................................. H02p 1/56
[58] Field of Search ............... 318/87, 93, 95, 111

[56] References Cited
UNITED STATES PATENTS

| | | |
|---|---|---|
| 3,184,664 | 5/1965 | Cunningham et al............ 318/93 X |
| 3,559,009 | 1/1971 | Mills .................... 318/95 |
| 3,059,160 | 10/1962 | Posselt .................. 318/87 X |
| 2,970,250 | 1/1961 | Hibbard ................. 318/111 X |
| 1,352,427 | 9/1920 | Candee .................. 318/93 |
| 1,730,861 | 10/1929 | Nottage ................. 318/111 X |

*Primary Examiner*—T. E. Lynch
*Attorney, Agent, or Firm*—Raymond A. Robic; Arthur Schwartz

[57] ABSTRACT

A static switching system for connecting two series-wound d.c. machines in motoring or generating operations, by simultaneously connecting them in series or in parallel. In order to make a new connection, the current in the machines is cut off. The potentials at various points with respect to the terminal are then kept steady in ascending order by means of resistors. A logic checks that this conditions is satisfied. Another logic selects which thyristors are to be turned on in order to make the desired connections. The invention is particularly useful in traction motors.

2 Claims, 1 Drawing Figure

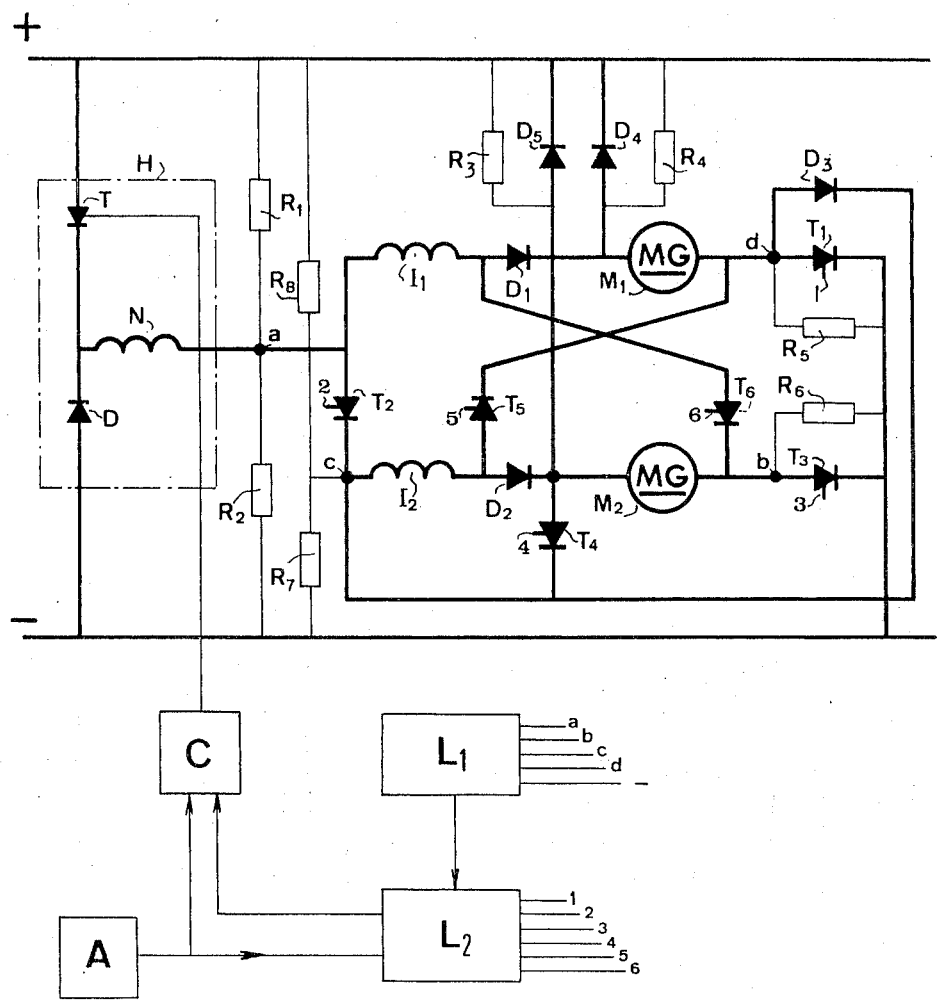

STATIC SWITCHING SYSTEM FOR INSTANTANEOUSLY MAKING VARIOUS CONNECTIONS BETWEEN TWO D.C. MACHINES

The invention relates to a static switching system for instantaneously connecting two series-excited d.c. machines connected to a d.c. source by a voltage adapter such as an electromechanical on-load top changer or a chopper. The machines may be connected either in series in motoring operation, or in parallel in motoring operation, or in series in generating operation, or in parallel in generating operation.

The invention applies more particularly to traction motors and enables better use to be made of their motoring and generating characteristics.

As is known, the following two conditions have to be satisfied for series-excited machines:

When changing over from motoring to generating, the current in the field winding should not be reversed, in order to ensure that the residual e.m.f. is sufficient for the machine to start up by itself in generating operation.

When two machines are in generating operation in parallel, the field windings should be crossed in order to balance the power output in a stable manner.

Some existing switches or cam controllers are capable of making the various aforementioned changeovers, but such devices are electromechanical and some time is lost during their operation.

In the case of electric traction, more particularly in the automatic control of locomotives, motor coaches and the like, the loss of time prevents the traction motor from braking instantaneously, and the switching systems rapidly deteriorate after very frequent braking.

The invention, which can obviate these disadvantages, relates to a static switching system which can make the aforementioned changeovers instantaneously and in a very reliable manner.

As is known, choppers generally comprise a main thyristor which closes the load circuit and which is then turned off by applying a reverse current supplied by a capacitor or an oscillating circuit via a second or "turn-off" thyristor, the inductive load circuit being shunted by an anti-parallel diode or "discharge" diode, which allows the current to go on flowing during non-energization periods.

It is also known that when traction motors are energized by a chopper, the latter is used in series, i.e., as a voltage reducer, for motoring operation and in parallel, i.e., as a voltage booster in generating operation. The terms "reducer" and "booster" are used in relation to an observer at the d.c. source supplying the chopper. A chopper connected in these two ways is used according to the invention in combination with the proposed static switching system. More generally, however, any voltage adapter disposed between the d.c. source and the two machines can fulfil the same function as a chopper.

The static switching system according to the invention is characterised in that it comprises:

A voltage adapter connected to the terminals of the d.c. source connected to the machines, comprising an output terminal whose potential may vary between zero and the source potential and also comprising a cut-off means adapted to interrupt the current in the output terminal, a first circuit connected between the voltage adapter output and the negative terminal of the source, comprising, in series and in the following order, the field winding of the first machine, a first diode, the armature of the first machine and a first thyristor, the aforementioned semiconducting devices being conductive in the direction specified in the list, a second circuit, in parallel with the first circuit, comprising in series and in the following order, a second thyristor, the field winding of the second machine, a second diode, the armature of the second machine, and a third thyristor, the aforementioned semiconducting devices being conductive in the direction specified in the list.

A fourth thyristor whose anode is connected to the cathode of the second diode and whose cathode is connected to the cathode of the second thyristor, a fifth thyristor whose anode is connected to the anode of the second diode and whose cathode is connected to the anode of the first thyristor, a sixth thyristor whose anode is connected to the anode of the first diode and whose cathode is connected to the anode of the third thyristor, a third diode whose anode is connected to the anode of the first thyristor and whose cathode is connected to the cathode of the fourth thyristor, a fourth and a fifth diode whose anodes are respectively connected to the cathodes of the first and second diodes and whose cathodes are connected to the positive terminal of the source, high-value resistors disposed and chosen so as to keep the potentials steady with respect to the negative pole of four points in the circuit and in ascending order, after the current has been cut off in the machines, the four points being the output of the voltage adapter, the anode of the first thyristor, the cathode of the second thyristor and the anode of the third thyristor, a first control logic adapted to measure the last-mentioned potentials, to determine their relative order and to permit or block the operation of a second control logic whose outputs are connected to the gates of the aforementioned thyristors in order to turn-on particular thyristors corresponding to the desired circuit for connecting the machines as soon as, after current has been cut off in the machines, the first logic indicates that the potentials are in ascending order, after which the second logic allows current to flow again in the machines through the agency of the voltage adapter, when the aforementioned particular thyristor have been turned-on.

The invention will be more clearly understood from the following embodiment and the accompanying single diagram, showing the electric circuit of a switching system using a chopper as a voltage adapter.

The chopper H is diagrammatically represented by its main thyristor T, its discharge diode D and an inductor N connecting the cathodes of T and D to the output terminal $a$ of the chopper; the inductor may be omitted and replaced by a single connection when the machines themselves have sufficiently large inductances. The chopper control unit C, by acting on the gate of T, also acts as a cut-off means for interrupting the current in terminal $a$.

If there is no current in terminal $a$, the potential thereof is kept steady by two high-value resistors $R_1$ and $R_2$ connected between $a$ and each terminal of the source.

Two circuits in parallel are connected between $a$ and the negative terminal of the source. The first circuit comprises, disposed in series and in the following order from the point $a$: the field winding $I_1$ of the first machine, a diode $D_1$, the armature $M_1$ of the first machine and a thyristor $T_1$, the direction of conduction of $D_1$ and $T_1$ being from $a$ to the negative terminal of the source.

The source circuit comprises, disposed in series and in the following order starting from point $a$: a thyristor $T_2$, the field winding $I_2$ of the second machine, a diode $D_2$, the armature $M_2$ of the second machine and a thyristor $T_3$, the direction of conduction of $T_2$, $D_2$ and $T_3$ being from $a$ to the negative terminal of the source.

A diode $D_3$ is connected between point $d$ (the anode of $T_1$) and conducts in the direction from $d$ to $c$, A thyristor $T_4$ being connected to $c$. A thyristor $T_5$ is connected between the anode of $D_2$ and point $d$, and the cathode of $T_5$ is connected to $d$. A thyristor $T_6$ is connected between the anode of $D_1$ and the anode of $T_3$ (point $b$), the cathode of $T_6$ being connected to $b$. The cathodes of diode $D_1$ and $D_2$ are connected by diodes $D_4$ and $D_5$ respectively to the positive terminal of the source, to which the cathodes of $D_4$ and $D_5$ are connected.

High-value resistors $R_1$ and $R_2$ are connected between point $a$ and the positive and negative terminals respectively, in order to keep the potential of $a$ steady with respect to the terminals of the source, when no current flows in the output $a$ of chopper H. Similarly the potentials of points $b$, $c$ and $d$ are kept steady with respect to the terminals of the source, when the current is cut off in the machines, by means of high-value resistors $R_3$–$R_8$.

Resistors $R_1 - R_8$ are selected so that the potentials of points $a, d, c, b$, with respect to the negative terminal of the source are in ascending order.

A control logic $L_1$ connected to the $a, d, c, b$ and negative terminals, measures the aforementioned potentials and determines their relative order. If the potentials are in ascending order, $L_1$ permits the operation of a second control logic $L_2$ which is designed to block all thyristors except those corresponding to the connection which it is desired to make between the machines. To this end, $L_2$ is provided with six outputs connected to gates 1 to 6 respectively of thyristors $T_1$ to $T_6$.

Logic $L_2$ in turn receives the change-over order from a general control unit which, in the chosen example, is a master controller A also acting on the chopper control unit C.

If the potentials are not in ascending order, $L_1$ prevents $L_2$ from operating since this merely indicates that the current has not been cut off in the machines and that it is not therefore possible to make a change-over.

Accordingly, the static switching system according to the invention operates as follows: Starting from any connection between the two machines which it is desired to modify (i.e., either the circuitry or the motoring or generating operation) the cut-off means of the voltage adapter is first used to cut off the current in the machines. In the selected example, control unit C blocks the chopper thyristor T.

Any of the thyristors $T_1 - T_6$ which are conducting are turned-off, whereupon the potentials of points $a, b$, $c$ and $d$ assume the values imposed by resistors $R_1$ to $R_8$.

Logic $L_1$ then allows logic $L_2$ to operate and logic $L_2$, in accordance with the particular change-over order received from the general control unit A, turns-on the particular thyristors corresponding to the desired connections and maintains the other thyristors in the blocking state.

In the case of motoring operation when the two machines are connected in series, logic $L_2$ turns-on thyristor $T_3$ only, thus forming the circuit $I_1$ $D_1$ $M_1$ $D_3$ $I_2$ $D_2$ $M_2$ $T_3$ between $a$ and the negative terminal.

In the case of motoring operation when the two machines are connected in parallel, logic $L_2$ turns-on thyristors $T_1$, $T_2$ and $T_3$ only, thus closing the following two circuits in parallel between $a$ and the negative terminal: $I_1$ $D_1$ $M_1$ $T_1$ and $T_2$ $I_2$ $D_2$ $M_2$ $T_3$.

In the case of generating operation when the two machines are connected in series, Logic $L_2$ turns-on thyristors $T_4$ $T_5$ and $T_6$ only, thus closing the following circuit between $a$ and the positive pole: $I_1$ $T_6$ $M_2$ $T_4$ $I_2$ $T_5$ $M_1$ $D_4$.

Finally, in the case of generating operation in which the two machines are coupled in parallel, logic $L_2$ turns-on thyristors $T_2$, $T_5$ and $T_6$ only, thus closing the following two circuits in parallel between $a$ and the positive terminal: $I_1$ $T_6$ $M_2$ $D_2$ and $T_2$ $I_2$ $T_5$ $M_1$ $D_4$.

It can be seen that, independently of the connection made, the current does not change direction in field windings $I_1$ and $I_2$ and that field windings $I_1$ and $I_2$ cross in the case of generating operation when the two machines are connected in parallel.

As soon as the particular thyristors for the desired connection have been selected and turned on by the control unit $L_2$, the latter permits control unit C to restore the current in terminal $a$ of the voltage adapter, — i.e., in the present case in which the voltage adapter is a chopper, the thyristor T thereof is returned on, after which the chopper operates in normal manner.

The cut-off means of the voltage adapter interrupts the current in terminal $a$ only for the time required for the thyristors corresponding to the existing connection to be turned off and for the thyristors corresponding to the desired new connection to be turned on.

The invention, which has been described with respect to two machines, can easily be applied to any even number of machines, e.g., by simple juxtaposition on identical systems.

Some of the semiconductors can be omitted from the specified circuit if not all of the four enumerated kinds of connection are used. The invention applies more particularly to traction motors.

I claim:

1. A static switching system for instantaneously connecting two series-excited d.c. machines in motoring or in generating operation by simultaneously connecting them in series or in parallel, characterised in that it comprises:
    a voltage adapter connected to the terminals of the d.c. source connected to the machines, comprising an output terminal whose potential may vary between zero and the source potential and also comprising a cut-off means adapted to interrupt the current in the output terminal,
    a first circuit connected between the voltage adapter output and the negative terminal of the source, comprising, in series and in the following order, the field winding of the first machine, a first diode, the armature of the first machine and a first thyristor, the aforementioned semiconducting devices being conductive in the direction specified in the list, a second circuit, in parallel with the first circuit, comprising in series and in the following order, a second thyristor, the field winding of the second machine, a second diode, the armature of the second machine, and a third thyristor, the aforementioned semiconducting devices being conductive in the direction specified in the list, a fourth thyristor whose anode is connected to the cathode of the second diode and whose cathode is connected to the cathode of the second thyristor, a fifth thyristor whose anode is connected to the anode of the second diode and whose cathode is connected to the anode of the first thyristor, a sixth thyristor whose anode is connected to the anode of the first diode and whose cathode is connected to the anode of third thyristor, a third diode whose anode is connected to the anode of the first thyristor and whose cathode is connected to the cathode of the fourth thyristor, a fourth and a fifth diode whose anodes are respectively connected to the cathodes of the first and second diodes and whose cathodes are connected to the positive terminal of the source, high-value resistors disposed and chosen so as to keep the potentials steady with respect to the negative pole of four points in the circuit and in ascending order, after the current has been cut off in the machines, the four points being the output of the voltage adapter, the anode of the first thyristor, the cathode of the second thyristor and the anode of the third thyristor, a first control logic adapted to measure the last-mentioned potentials, to determine their relative order and to permit or block the operation of a second control logic whose outputs are connected to the gates of the aforementioned thyristors in order to turn on particular thyristors corresponding to the desired circuit for connecting the machines as soon as, after current has been cut off in the machines, the first logic indicates that the potentials are in ascending order, after which the second logic allows current to flow again in the machines through the agency of the voltage adapter, when the aforementioned particular thyristors have been turned on.

2. A static switching system according to claim 1, wherein the voltage adapter is a current chopper.

* * * * *